(12) United States Patent
Bouti et al.

(10) Patent No.: US 12,194,666 B2
(45) Date of Patent: Jan. 14, 2025

(54) CO-INJECTION HOT RUNNER NOZZLE

(71) Applicant: HUSKY INJECTION MOLDING SYSTEMS LTD., Bolton (CA)

(72) Inventors: Abdeslam Bouti, St. Albans, VT (US); Hakimuddin Boxwala, Brampton (CA); Nathan Gabriel Southwick, Swanton, VT (US); Maciej Brelski, Brampton (CA); Dietmar Tiemo Brand, North York (CA); Adam Christopher Ulemek, Mississauga (CA); Dirk Holger Schlums, Mulmur (CA)

(73) Assignee: Husky Injection Molding Systems Ltd., Bolton (CA)

( * ) Notice: Subject to any disclaimer, the term of this patent is extended or adjusted under 35 U.S.C. 154(b) by 219 days.

(21) Appl. No.: 17/838,915

(22) Filed: Jun. 13, 2022

(65) Prior Publication Data
US 2022/0305710 A1    Sep. 29, 2022

Related U.S. Application Data

(63) Continuation of application No. 16/481,683, filed as application No. PCT/CA2018/050023 on Jan. 12, 2018, now Pat. No. 11,358,313.
(Continued)

(51) Int. Cl.
*B29C 45/30*    (2006.01)
*B29B 11/08*    (2006.01)
(Continued)

(52) U.S. Cl.
CPC .............. *B29C 45/30* (2013.01); *B29B 11/08* (2013.01); *B29C 45/164* (2013.01);
(Continued)

(58) Field of Classification Search
CPC ..... B29C 45/30; B29C 45/164; B29C 45/278; B29C 2045/279; B29C 45/1603;
(Continued)

(56) References Cited

U.S. PATENT DOCUMENTS 4,895,504 A    1/1990    Kudert et al.
4,990,301 A    2/1991    Krishnakumar et al.
(Continued)

FOREIGN PATENT DOCUMENTS

CA    2965724 A1    5/2016
EP    0125787 B2    3/2000
(Continued)

*Primary Examiner* — S. Behrooz Ghorishi
(74) *Attorney, Agent, or Firm* — Wolf, Greenfield & Sacks, P.C.

(57) ABSTRACT

A co-injection hot runner nozzle comprises an inner melt flow channel and an annular outer melt flow channel that surrounds the inner melt flow channel. The inner and outer melt flow channels have a first common source. The nozzle further comprises an annular intermediate melt flow channel disposed between the inner and outer melt flow channels. The annular intermediate melt flow channel is at least partly defined by a plurality of spiral grooves, each spiral groove having a respective inlet and defining a helical flow path. Lands between adjacent spiral grooves increase in clearance in a downstream direction. An annular axial flow path is defined over the lands. A plurality of feeder channels having a second common source is configured to supply melt to the plurality of inlets of the spiral grooves. The relationship of feeder channels to spiral grooves may be one-to-one. The inlets may be longitudinal channels.

3 Claims, 10 Drawing Sheets

Related U.S. Application Data (60) Provisional application No. 62/461,473, filed on Feb. 21, 2017.

(51) Int. Cl.
  *B29C 45/16* (2006.01)
  *B29C 45/27* (2006.01)

(52) U.S. Cl.
  CPC ...... *B29C 45/278* (2013.01); *B29C 2045/279* (2013.01); *B29C 2949/3034* (2022.05)

(58) Field of Classification Search
  CPC ... B29C 2045/308; B29C 45/27; B29B 11/08; B29B 2911/1414; B29K 2105/258
  See application file for complete search history.

(56) References Cited

U.S. PATENT DOCUMENTS

| | | |
|---|---|---|
| 5,783,234 A | 7/1998 | Teng |
| 5,891,381 A | 4/1999 | Bemis et al. |
| 5,900,200 A | 5/1999 | Teng |
| 6,062,841 A | 5/2000 | Gellert et al. |
| 6,089,468 A | 7/2000 | Bouti et al. |
| 6,349,886 B1 * | 2/2002 | Bouti ................. B29C 45/1603 239/404 |
| 6,524,093 B2 | 2/2003 | Bouti |
| 7,306,446 B2 | 12/2007 | Sabin et al. |
| 7,544,056 B2 | 6/2009 | Fairy |
| 8,801,426 B2 | 8/2014 | Galt et al. |
| 2002/0070288 A1 | 6/2002 | Bouti |
| 2002/0081348 A1 | 6/2002 | Bouti |
| 2016/0114505 A1 | 4/2016 | Toyoda et al. |
| 2017/0312961 A1 * | 11/2017 | Mühlemann ........ B29C 45/1642 |

FOREIGN PATENT DOCUMENTS

| | | |
|---|---|---|
| EP | 0921930 B1 | 10/2001 |
| JP | H06226785 A | 8/1994 |
| JP | 3595384 B2 | 12/2004 |

* cited by examiner

FIG. 12

CO-INJECTION HOT RUNNER NOZZLE

CROSS-REFERENCE TO RELATED APPLICATIONS

This application is a continuation of U.S. Ser. No. 16/481,683, which is a national stage filing under 35 U.S.C. § 371 of International Application PCT/CA2018/050023, filed Jan. 12, 2018, which claims the benefit under 35 U.S.C. § 119(e) of U.S. provisional application Ser. No. 62/461,473, filed Feb. 21, 2017, each of the foregoing is herein incorporated by reference in its entirety.

TECHNICAL FIELD

The present disclosure relates to injection molding, and more particularly to a hot runner nozzle for use in co-injection molding.

BACKGROUND

A co-injection molding apparatus may include a hot runner nozzle designed to dispense a stream of melted molding material ("melt") having multiple annular layers. In one example of a co-injection hot runner nozzle, the nozzle may dispense an inner melt layer, an annular outer melt layer, and an annular intermediate (or "core") melt layer between the two. The intermediate layer may for example be made from a barrier material (e.g. an oxygen barrier material), which may be intended to protect contents of a molded article, or a container subsequently blow-molded from the molded article, from outside contamination (e.g. oxidation). In another example, the intermediate layer may be comprised of a post-consumer regrind material, which may be used to limit material costs. The multi-layer flow may be dispensed or injected into a mold cavity during co-injection molding of an article having a generally tubular shape, such as a preform that is blow-moldable to form a container. The inner and outer melt layers may form the inner and outer skin, respectively, of the molded article, and the intermediate material may be sandwiched between the inner and outer skin.

To form each of the annular layers in a multi-layer melt stream, a co-injection nozzle may employ what is colloquially referred to as a "coat hanger" channel geometry. In such a channel geometry, melted molding material flows from a single inlet into a pair of collector channels defined within the nozzle. The two collector channels may have the shape of two curved (e.g. half-circular), mirror-image tusks that extend from the single common inlet and meet at their distal ends. The two tusk-shaped channels may define respective clockwise and counter-clockwise flows that meet at a termination point on an opposite side of the resulting annulus from the inlet. An annular overflow passage may allow melt to propagate downwardly past the collector channel termination point. The overflow passage may take the form of a constant width split at a downstream-most edge of the collector channels, through which molding material may pass to form an annular flow.

The coat hanger channel geometry described above may yield an annular melt layer having a non-uniform viscosity profile in which a velocity of the annular flow portion that is closest to the inlet may be higher than a velocity of the remainder of the annular flow. As well, the temperature of the melt at the inlet side may be higher than elsewhere in the resultant annular flow. This may result in anomalies in molded articles, such as witness lines in areas where injected intermediate molding material was hotter than in adjacent mold areas, which may be disadvantageous. Various technical challenges associated with coat hanger channels are described in U.S. Pat. No. 6,524,093.

Other types of co-injection hot runner nozzles may define annular flows in other ways. For example, a hot runner nozzle may define an annular flow using a plurality of flow transition channels arranged about a periphery of the nozzle. Each channel may widen in a downstream direction and may have a part-annular outlet that defines a part-annular melt stream. The outlets may be arranged in a ring so that, collectively, they define an annular flow.

Disadvantageously, the annular flow produced by such a channel geometry may have a non-uniform viscosity profile and/or a non-uniform temperature profile. In particular, the temperature of the melt at the divergent walls of each of the channels may be higher, due to shear effects, than the temperature of the melt in the middle of the channel. As a result, the viscosity of the resultant annular flow may be lower at the boundaries between adjacent channel outlets than it is elsewhere in the annular flow. The lower viscosity areas may produce thinner melt regions, blemishes and/or witness lines in corresponding areas of a molded article, which may be disadvantageous.

Nozzles incorporating flow transition structures such as coat hangers or flow transition channels may produce annular flows having weld lines at the point where flow fronts meet. Such weld lines may manifest in a molded article as a blemish or line, which may also be disadvantageous.

SUMMARY

According to one aspect of the present disclosure, there is provided a co-injection hot runner nozzle comprising: an inner melt flow channel; an annular outer melt flow channel that surrounds the inner melt flow channel, the inner and outer melt flow channels having a first common source; an annular intermediate melt flow channel, disposed between the inner and outer melt flow channels, that is at least partly defined by a plurality of spiral grooves, each spiral groove having a respective inlet and defining a helical flow path, with lands between adjacent spiral grooves that increase in clearance in a downstream direction, wherein an annular axial flow path is defined over the lands; and a plurality of feeder channels, having a second common source, for supplying melt to the plurality of inlets of the spiral grooves.

In some embodiments, each of the feeder channels is for supplying melt to the inlet of a respective one of the spiral grooves.

In some embodiments, each of the inlets comprises a longitudinal channel, and the nozzle further comprises, for each spiral groove, a flow redirection channel for redirecting longitudinally flowing melt from the respective inlet into the spiral groove. Each flow redirection channel may comprise a gradual bend of about 70 degrees away from longitudinal.

The spiral grooves may be formed in an inner or outer wall of the annular intermediate melt flow channel. Each spiral groove may decrease in depth in the downstream direction.

The co-injection hot runner nozzle may further comprise a plurality of flow transition channels arranged in a ring for defining the outer melt flow channel, each of the flow transition channels having an inlet, an outlet with a part-annulus shape, and a pair of opposing side walls that diverges in the downstream direction.

In some embodiments, the inner melt flow channel is substantially cylindrical.

In another aspect of the present disclosure, there is provided a co-injection molding method comprising:

splitting a first melt flow between an inner channel and an outer channel of a co-injection hot runner nozzle, the outer channel forming an annular outer melt flow that surrounds an inner melt flow formed by the inner channel; and splitting a second melt flow among a plurality of feeder channels upstream of an annular intermediate channel of the co-injection hot runner nozzle, the intermediate channel being disposed between the inner and outer channels and being at least partly defined by a plurality of spiral grooves, each spiral groove having a respective inlet, the plurality of feeder channels supplying melt to the inlets of the plurality of spiral grooves, the intermediate channel being further defined by lands between adjacent spiral grooves that increase in clearance in a downstream direction, wherein melt comprising the second melt flow travels along helical paths defined by the respective spiral grooves and spills over the lands to form an annular axial flow.

In some embodiments, the number of feeder channels matches the number of spiral grooves and each feeder channel supplies melt to the inlet of a respective one of the spiral grooves.

In some embodiments, each inlet is a longitudinal channel and the nozzle further comprises gradually redirecting longitudinally flowing melt from each inlet by about 70 degrees into its respective spiral groove.

In some embodiments, the forming of the annular outer melt flow comprises passing melt through a plurality of flow transition channels arranged in a ring, each of the flow transition channels having an inlet, an outlet with a part-annulus shape, and a pair of opposing side walls that diverges in the downstream direction.

In another aspect of the present disclosure, there is provided a co-injection hot runner nozzle comprising: a first insert defining an inner channel; a second insert that fits over the first insert; and a tip that fits over the second insert, wherein the second insert and the tip cooperate to define a plurality of flow transition channels arranged in a ring, the plurality of flow transition channels collectively defining an annular outer channel about the inner channel, each of the flow transition channels having an inlet, an outlet with a part-annulus shape, and a pair of opposing side walls that diverges in a downstream direction, wherein the first insert and the second insert cooperate to define an annular intermediate channel, between the inner channel and the outer channel, that is at least partly defined by a plurality of spiral grooves, each spiral groove having a respective inlet, the plurality of inlets being configured to receive melt from a plurality of feeder channels from a common source, each spiral groove defining a helical flow path in the downstream direction, with lands between the spiral grooves increasing in clearance in the downstream direction, wherein an annular axial flow path is defined over the lands.

In some embodiments, the number of feeder channels matches the number of spiral grooves and each feeder channel supplies melt to the inlet of a respective one of the spiral grooves.

In some embodiments, each of the inlets comprises a longitudinal channel and the nozzle further comprises, for each spiral groove, a flow redirection channel for redirecting longitudinally flowing melt from the respective inlet into the spiral groove. Each of the flow redirection channels may comprise a gradual bend of about 70 degrees away from longitudinal.

In a further aspect of the present disclosure, there is provided a tubular insert for a co-injection hot runner nozzle, comprising: a cylindrical wall with an inner face and an outer face, the inner face for defining an outer periphery of a channel having an upstream multi-path helical flow portion progressively transitioning into a downstream annular flow portion, the outer face for defining an inner periphery of a plurality of flow transition channels for forming an annular flow, each of the flow transition channels having a pair of opposing side walls that diverges in a downstream direction. The inner face of the cylindrical wall may comprise a plurality of spiral grooves for at least partly defining the upstream multi-path portion.

Other features will become apparent from the drawings in conjunction with the following description.

DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

In this document, the term "part-annular" should be understood to mean "shaped like a segment of an annulus." In this document, the term "exemplary" should be understood to mean "an example of" and not necessarily to mean that the example is preferable or optimal in some way. Terms such as "top," "bottom," and "height" may be used to describe some embodiments in this description but should not be understood to necessarily connote an orientation of the embodiments during use.

Figure 1:
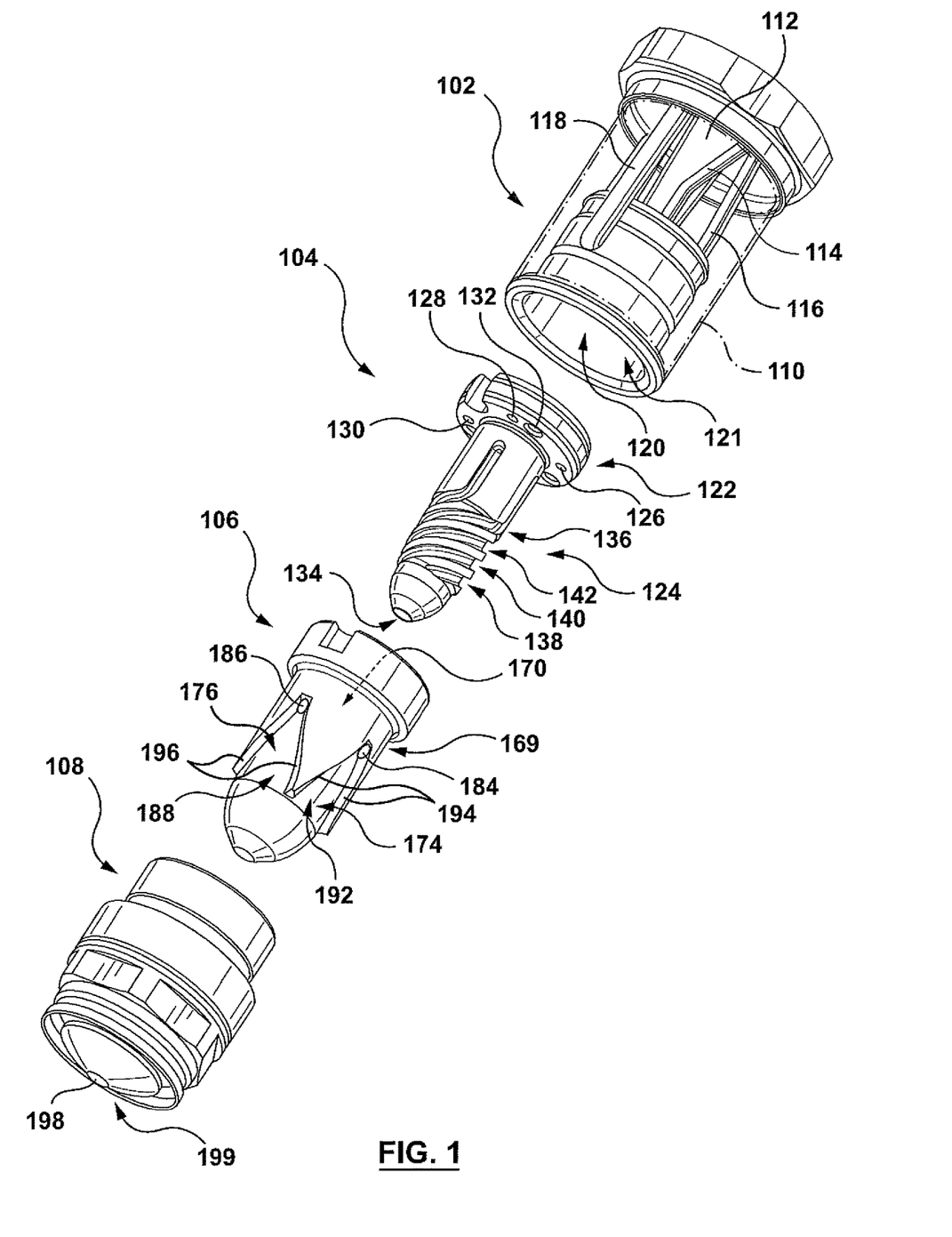
FIG. 1 is an exploded view of an exemplary co-injection hot runner nozzle.
Figure 2:
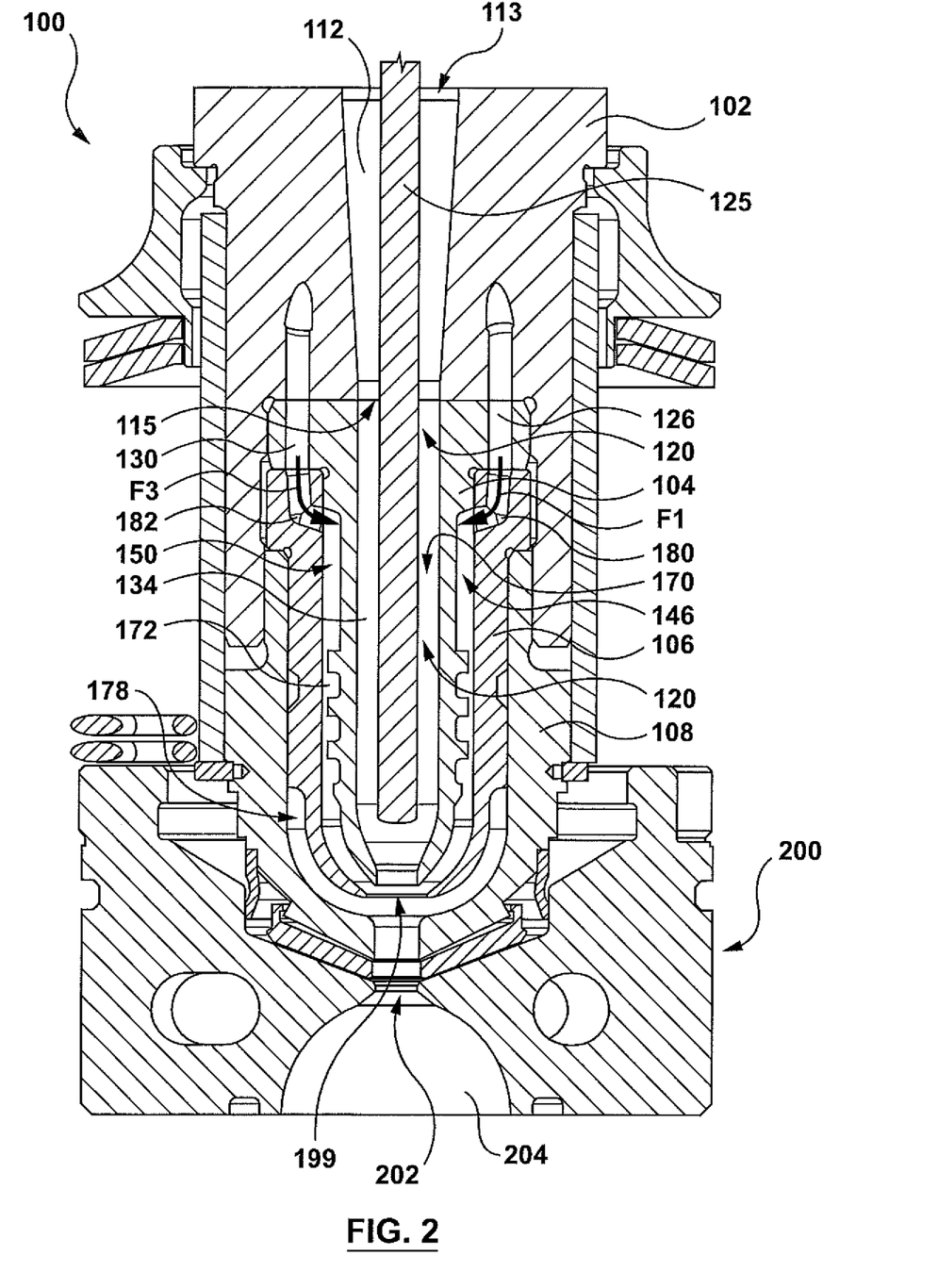
FIG. 2 is a longitudinal cross section of the co-injection hot runner nozzle of FIG. 1.

Referring to FIGS. 1 and 2, an exemplary co-injection hot runner nozzle 100 (or simply "nozzle") is illustrated in exploded view and longitudinal cross-section, respectively. The exemplary nozzle 100 may for example form part of a hot runner in a co-injection molding machine (not illustrated). The nozzle 100 is designed to form and dispense a multilayer melt flow comprising an inner melt layer and an annular outer melt layer sandwiching an annular intermediate melt layer. The inner and outer layers may for example be polyethylene terephthalate ("PET"), and the intermediate layer may for example be a barrier or post-consumer regrind material or doped PET. As will be described, the design of nozzle 100 may promote uniformity of temperature and viscosity in the generated annular intermediate layer as well as conserve energy, maximize mold machine capacity and promote molded article quality.

The exemplary nozzle 100 includes four component parts: a housing 102, a spiral groove insert 104, a tulip insert 106, and a tip 108.

The housing 102 defines various channels for supplying melted molding material to downstream nozzle components 104, 106 and 108 for forming the inner melt layer, annular intermediate layer, and the annular outer layer. The channels of housing 102 are visible within the cutaway section 110, which is depicted in FIG. 1 using dashed lines. The channels include an inner layer material channel 112, a pair of intermediate layer material channels 114, 116, and an outer layer material channel 118. It will be appreciated that the shapes of these channels as depicted in FIG. 1 reflect the shapes of the negative or hollow spaces defined therewithin and may vary in alternative embodiments.

The inner layer material channel 112 is a centrally disposed, axial channel that extends between an inlet 113 and an outlet 115 (FIG. 2) of housing 102. The outlet 115 is situated within a cylindrical receptacle 120 (FIG. 1) at a downstream end 121 of the housing 102. The receptacle 120 is sized and shaped to receive a cylindrical base portion 122 of the adjacent spiral groove insert 104 when the nozzle 100 is assembled (see FIG. 2). The inner layer melt channel 112 is sufficiently wide for a valve stem 125 (FIG. 2) to pass therethrough with sufficient space remaining around the valve stem for melt surrounding the valve stem 125 to flow downstream in an annular flow. The valve stem 125 is for opening and closing a tip of the nozzle 100 during a molding cycle.

Referring to FIG. 1, each of the two intermediate layer material channels 114, 116 of housing 102 splits into two sub-channels, which are not expressly illustrated. The four sub-channels supply molten intermediate layer material to four respective outlets, also not expressly illustrated, that are equally spaced about a periphery of the housing 102, within the receptacle 120.

The outer layer material channel 118 is offset from center within the housing 102. In the present embodiment, the outer layer material channel 118 and the inner layer material channel 112 are presumed to have a common source upstream of the nozzle 110 (not depicted). The source may for example be an injection unit for supplying pressurized molten PET to a hot runner comprising a plurality of nozzles including nozzle 100.

Figure 3:
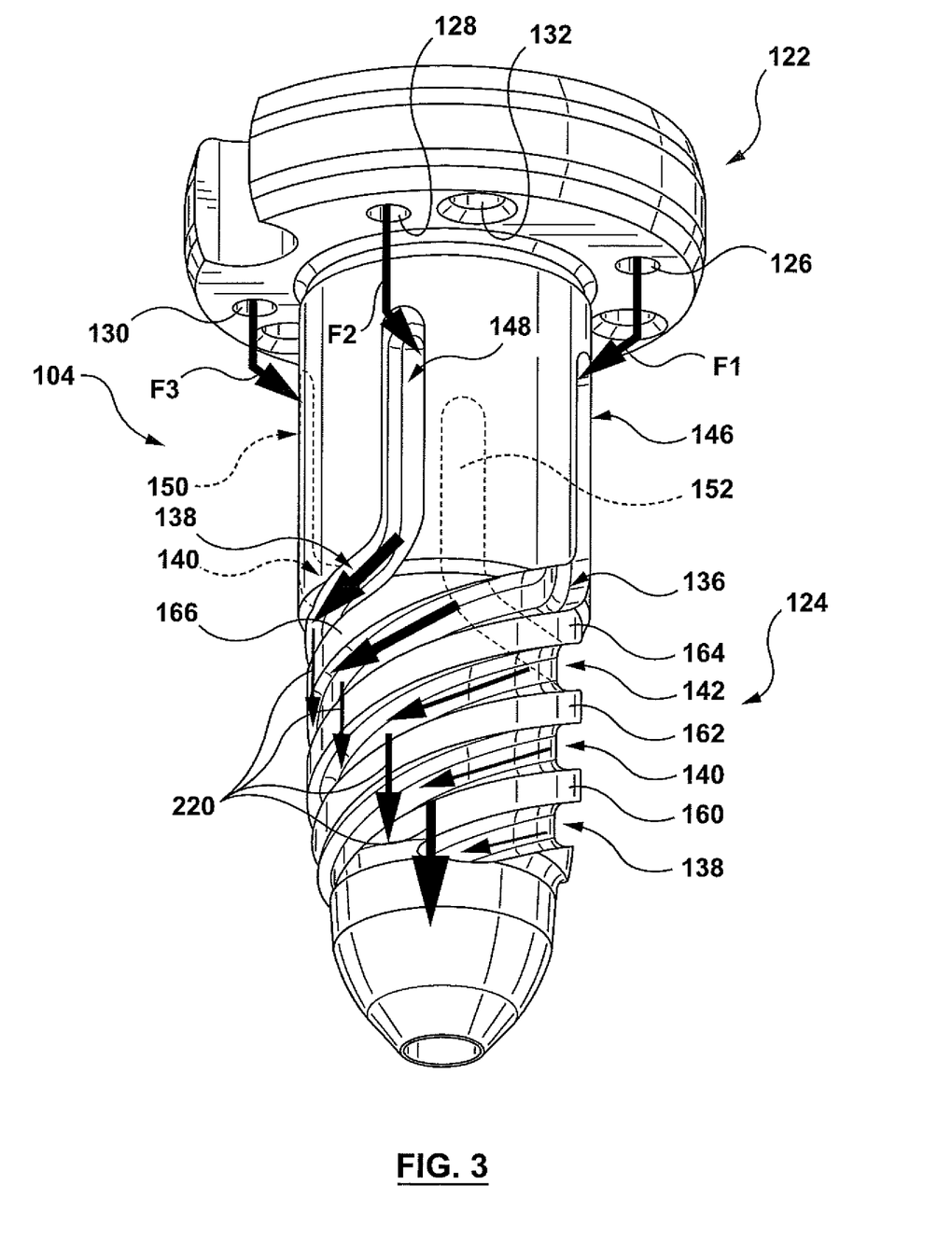
FIG. 3 is a perspective view of a spiral groove insert component of the nozzle of FIG. 1.

The spiral groove insert 104 cooperates with the tulip insert 106 (described below) to define an annular intermediate melt flow channel 172 therebetween (FIG. 2). FIG. 3 provides an enlarged perspective view of the spiral groove insert 104, in perspective view, in isolation from other nozzle components. As illustrated, the spiral groove insert 104 has a base portion 122 and a male projecting portion 124.

The base portion 122 of spiral groove insert 104 is generally cylindrical and has four intermediate material channels defined therethrough. Three of the channels, denoted as channels 126, 128 and 130, are visible in FIGS. 1 and 3. The four intermediate material channels are sized and equally spaced about the base portion 122 for alignment with the intermediate layer material outlets of the housing 102 (described above).

The base portion 122 of spiral groove insert 104 also has a passage 132 therethrough for outer layer material. The passage 132 aligns with the outer layer material channel 118 of housing 102 (described above).

Four spiral grooves 136, 138, 140 and 142, best seen in FIG. 3, are defined in an outer surface of the male projecting portion 124 of spiral groove insert 104. Each spiral groove 136, 138, 140 and 142 is interleaved with the other spiral grooves and defines a helical flow path. In the present embodiment, the length and pitch of each spiral groove 136, 138, 140 and 142 is such that each spiral groove wraps once around the male projecting portion 124. The number of spiral grooves, their length and their pitch may vary in alternative embodiments.

Each spiral groove has a respective inlet for receiving molten intermediate layer material. In the present embodiment, the inlet is a straight longitudinal groove in a surface of the male projecting portion 124. The four inlets of the present embodiment are spaced equally about the male projecting portion 124 and are aligned with the intermediate material channels defined through the base portion 122. Referring to FIG. 3, it can be seen that the four inlets 146, 148, 150, and 152 supply spiral grooves 136, 138, 140, and 142, respectively.

A plurality of lands 160, 162, 164 and 166 (FIG. 3) is interleaved with spiral grooves 136, 138, 140 and 142, i.e. each land is between two adjacent spiral grooves. The lands diminish in height in the downstream direction. As such, when the male projecting portion 124 is covered by tulip insert 106, the clearance over the lands increases in the downstream direction, and an annular axial flow path is defined over the lands, as will be described.

The spiral groove insert 104 also has an axial cylindrical inner melt flow channel 134 defined therethrough. In the present embodiment, the inner melt flow channel 134 is sized so that the valve stem 125 (FIG. 2) can pass therethough with sufficient space remaining for inner layer melt to flow, in an annular stream surrounding the valve stem 125, towards a tip of the nozzle 100.

As noted earlier, tulip insert 106 (FIGS. 1 and 2) cooperates with the spiral groove insert 104 to define annular intermediate melt flow channel 172 therebetween. The tulip insert 106 has a cup-like shape, with a cylindrical wall 169 defining a cylindrical cavity 170 opening towards the upstream end of the insert 106 (FIG. 1). The inner face of the cylindrical wall 169 of the tulip insert 106, which is substantially cylindrical, defines the outer periphery of the channel 172. The cavity 170 is for receiving the male projecting portion 124 of spiral groove insert 104. When the tulip insert 106 and spiral groove insert 104 are mated, the spiral grooves 136, 138, 140 and 142 define part of the inner wall of the resultant annular intermediate melt flow channel 172. As will be described, these spiral grooves may promote a uniform viscosity and temperature of the annular intermediate melt stream formed within the intermediate melt flow channel 172. Thus, the intermediate melt flow channel 172 has an upstream multi-path helical flow portion that progressively transitions into a downstream annular flow portion.

The tulip insert 106 also cooperates with the tip 108 (described below) to define therebetween an annular outer melt flow channel 178 (FIG. 2) that surrounds the intermediate melt flow channel 172. The outer face of the cylindrical wall 169 of tulip insert 106 has four substantially triangular indentations, two of which are visible in FIG. 1 at reference numerals 174, 176. Each indentation defines an inner portion of a single flow transition channel. The complementary outer portion of each flow transition channel is defined by an interior surface of the tip 108 (described below) that is not visible in FIG. 1.

The purpose of a flow transition channel is to change the shape of an inflowing stream of molten outer layer material from non-annular to part-annular (quarter-annular in the present embodiment). The part-annular outlets of the multiple flow transition channels comprising the outer melt flow channel 178 are arranged in a ring so that they collectively produce an annular melt flow.

Figure 4:
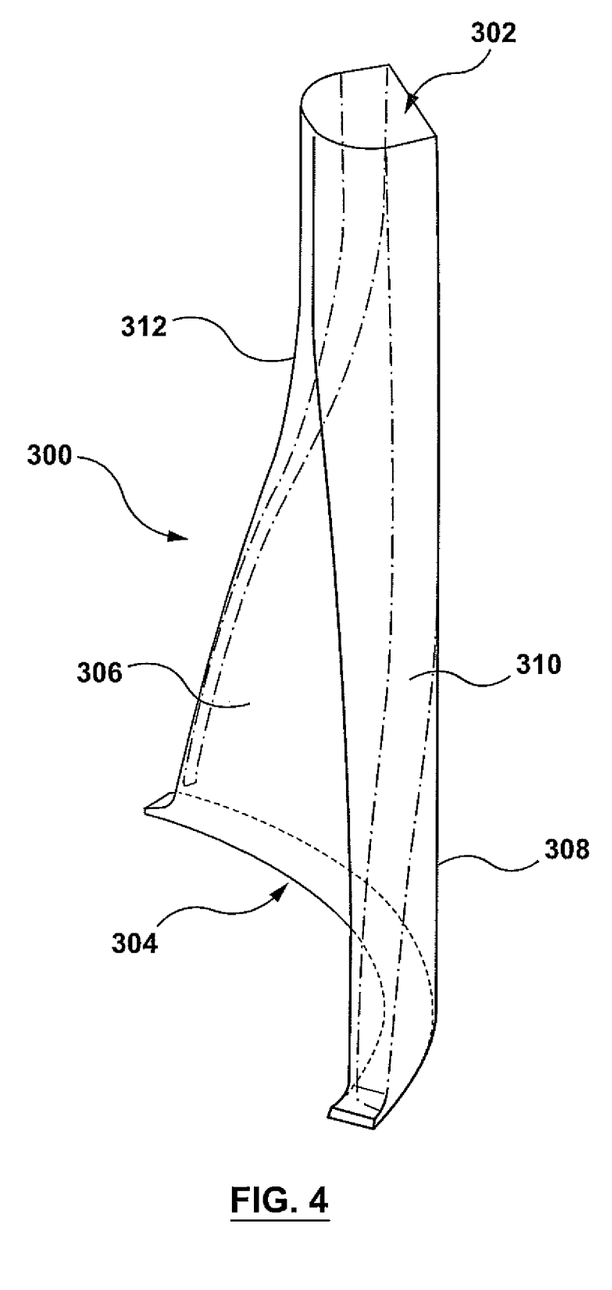
FIG. 4 is a perspective view of one of a number of flow transition channels defined within the nozzle of FIG. 1.

An example flow transition channel 300 is illustrated in top perspective view in FIG. 4. The other flow transition channels defined in nozzle 100 may have a similar appearance.

As illustrated in FIG. 4, flow transition channel 300 has a tubular inlet 302 and a part-annular outlet 304. The channel 300 is defined by curved inner wall 306, a curved outer wall 308, and a pair of narrow opposing side walls 310 and 312 that diverge in the downstream direction. In the present embodiment, the side walls 310, 312 have respective ogee shapes which are mirror images of one another. In particular, each wall has an upstream convex ogee portion and a downstream concave ogee portion. Ogee-shaped side walls may facilitate manufacture of the nozzle 100 in some embodiments. In particular, the ogee shape may be a function of how flow transition channels are machined in the cylindrical face of the tulip insert 106, e.g. by milling axially as the insert 106 is selectively rotated about its center axis. Ogee-shaped side walls are not necessarily present in all embodiments.

The shape of the flow transition channel 300 may be compared to that of an inverted funnel whose larger opening has been flattened and bent to form part of an annulus. The flow transition channel may colloquially be referred to as a "tulip" in view of its flower-shaped profile when viewed broadside, giving the tulip insert 106 its name.

Referring back to FIG. 1, indentations 174, 176 represent the inner portions of two adjacent flow transition channels, each similar to channel 300 of FIG. 4. The tubular inlets 184, 186, part-annular outlets 188, 192, and pairs 194, 196 of divergent opposing side walls of these channels 174, 176, respectively, are also visible in FIG. 1.

Figure 5:
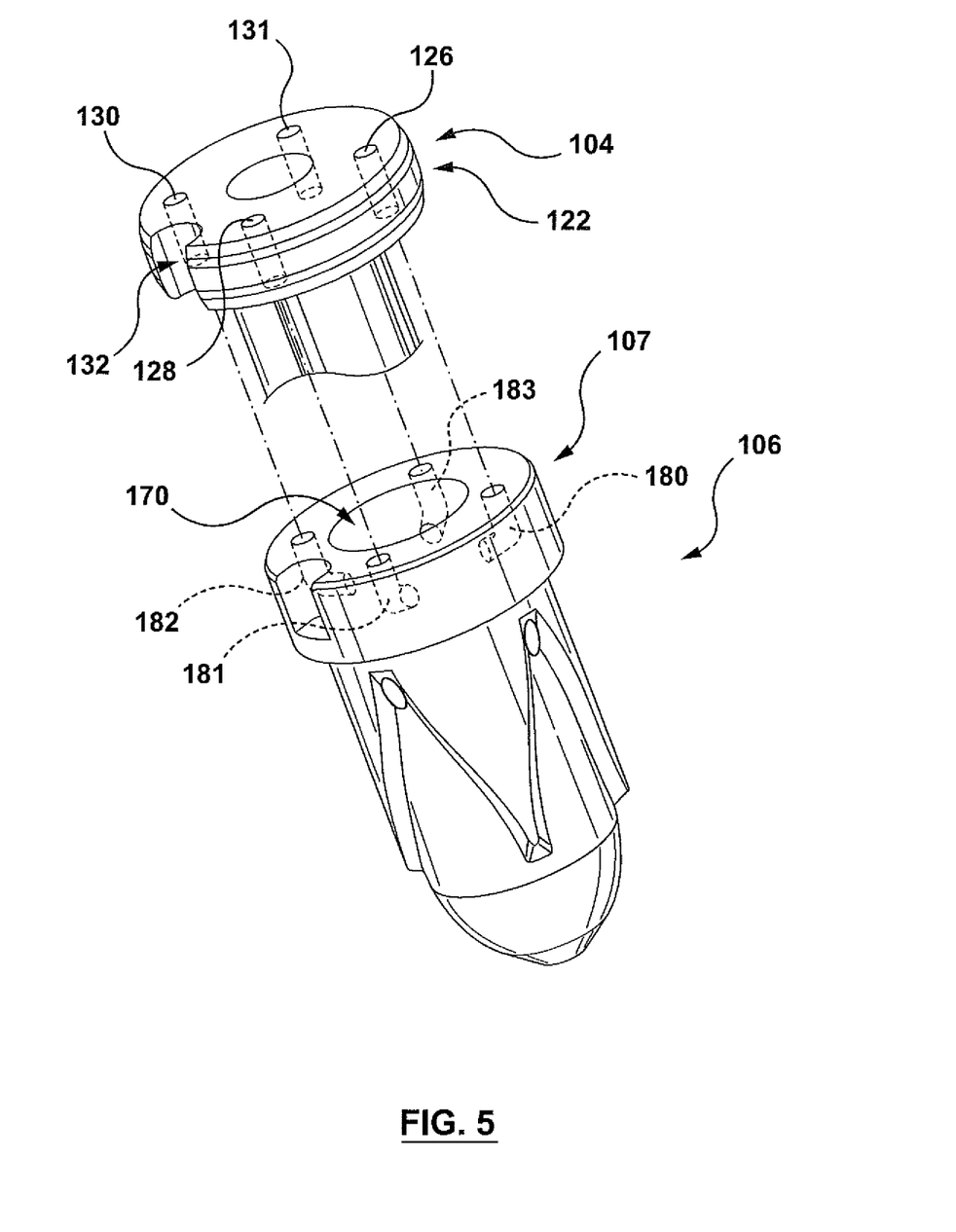
FIG. 5 is a perspective view of two components of the co-injection hot runner nozzle of FIG. 1.

In the present embodiment, tulip insert 106 also defines four elbow-shaped channels 180, 181, 182 and 183 in a flange 107 at the upstream end of the tulip insert 106. Each elbow-shaped channel effects a bend of approximately 100 degrees. The elbow channels 180, 181, 182 and 183, which are shown in dashed lines in the perspective view of tulip insert 106 of FIG. 5, fluidly interconnect four respective intermediate material channels 126, 128, 130 and 131 in the base portion 122 of spiral groove insert 104 with four inlets 146, 148, 150 and 152 on the surface of the male projecting portion 124 of spiral groove insert 104, respectively (see FIG. 3). As will be appreciated from FIG. 5, each elbow-shaped channel 180, 181, 182 and 183 is oriented to redirect an incoming longitudinal flow radially inwardly. Referring to FIG. 3, the resultant trajectory of the melt flow through three of the four elbow-shaped channels is represented by curved arrows F1, F2 and F3. FIG. 2 illustrates two of the elbow channels 180, 182 in cross-section in conjunction with associated melt flow trajectories F1, F3 respectively.

Referring again to FIG. 5, the four elbow channels 180, 181, 182 and 183 defined by tulip insert 106, the four intermediate material channels 126, 128, 130 and 131 defined in the base portion 122 of spiral groove insert 104, and the four sub-channels defined in the housing 102 (described above) may be referred to individually or collectively as "feeder channels" 210, 212, 214 and 216 as they serve to feed (supply) melt to the inlets 146, 148, 150 and 152 to spiral grooves 136, 138, 140 and 142, respectively.

The tip 108 (FIGS. 1 and 2) is a nozzle component that is sized and shaped to fit over the downstream end of tulip insert 106. An interior surface of the tip (not visible in FIG. 1) defines complementary outer portions of the four flow transition channels whose inner portions are defined on the exterior surface of the tulip insert 106. A round opening 198 in a downstream end 199 of the tip 108 dispenses the multi-layer melt stream when the valve stem 125 is in the open position shown in FIG. 2.

The outer surface of the downstream end 199 of tip 108 is shaped for mating with a gate insert 200 (FIG. 2). The gate insert 200 defines a gate 202 into a mold cavity 204 for molding an article, such as a preform or other container, from the multilayer melt stream.

Figure 6A:
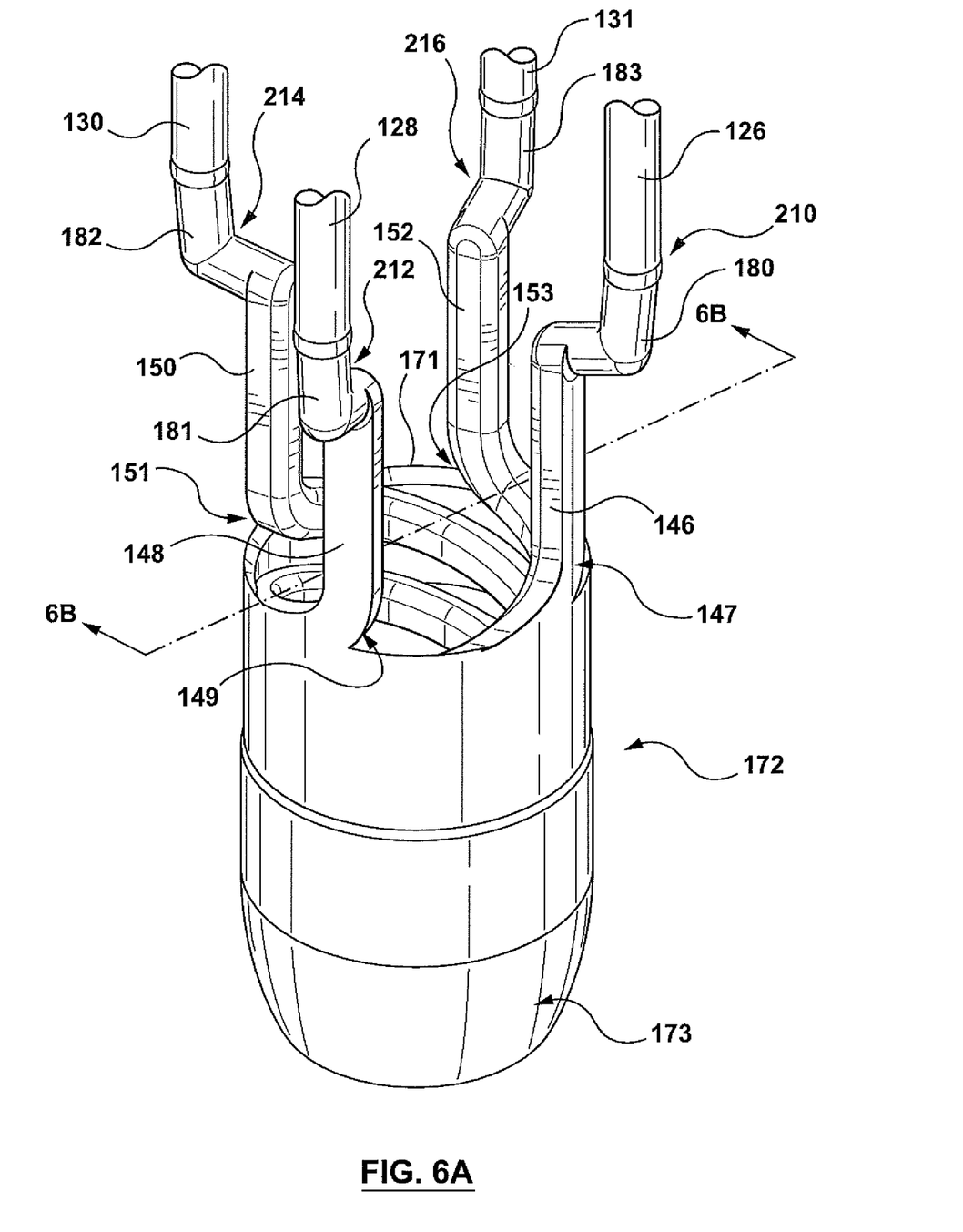
FIG. 6A is a perspective view of melt flowing through a portion of the nozzle of FIG. 1.
Figure 6B:
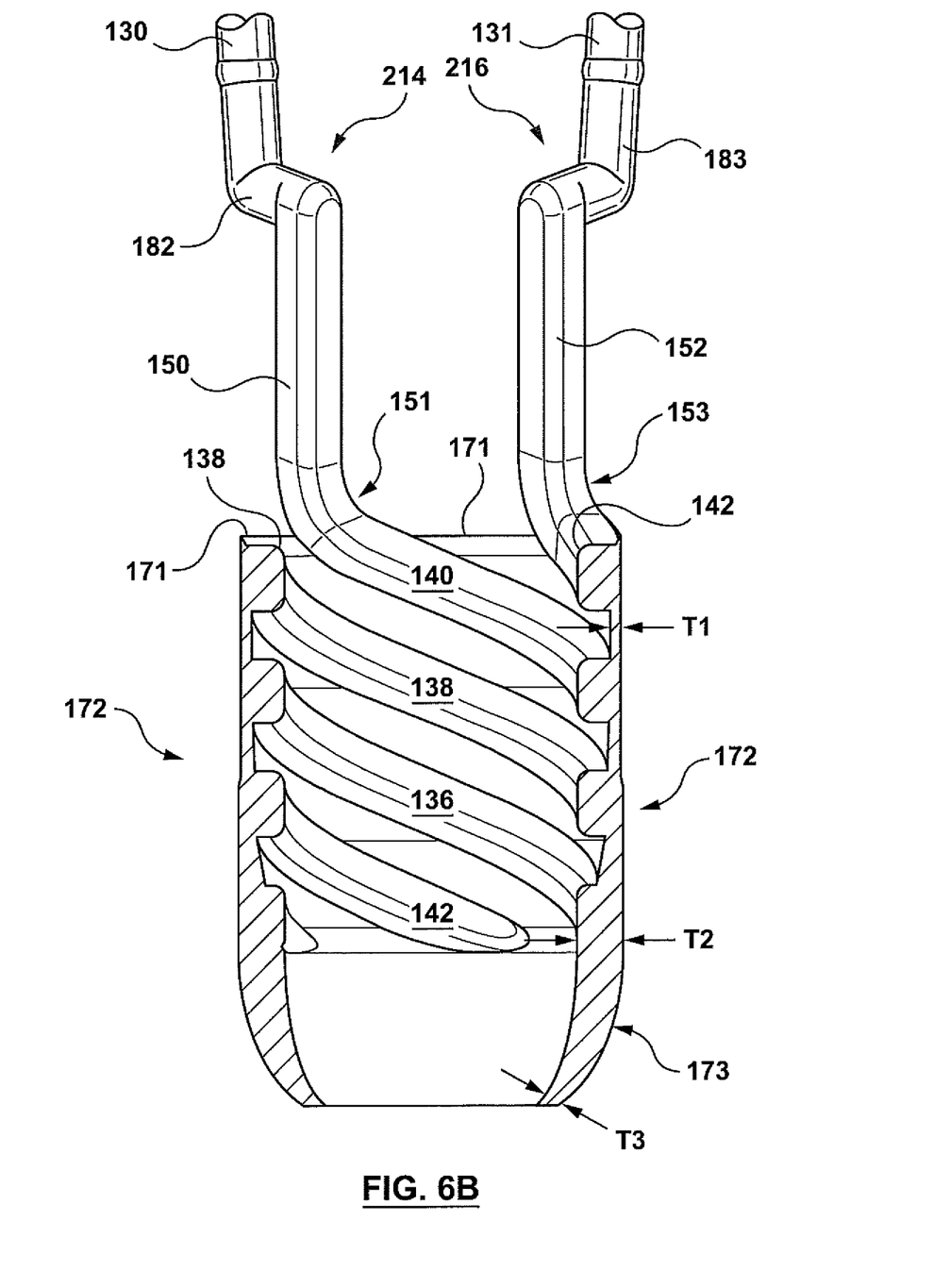
FIG. 6B is a cross section of the melt of FIG. 6A taken along line 6B-6B.

FIG. 6A illustrates, in perspective view and in isolation from nozzle components 102, 104, 106 and 108, melt flowing through the intermediate melt flow channel 172 and the immediately upstream portions of the four feeder channels 210, 212, 214 and 216 defined by the nozzle 100 of FIGS. 1 and 2. The positive shape depicted in FIG. 6A reflects the negative shape (i.e. passages) defined by these channels. For clarity, the same reference numerals that are used in FIGS. 1-3 and 5 to refer to the channels (negative spaces) are used in FIG. 6A to refer to the shapes (positive spaces) formed by those channels. FIG. 6B is a cross section of the channels depicted in FIG. 6A taken along line 6B-6B in FIG. 6A.

As shown in FIG. 6A, the upstream end of the annular intermediate flow channel 172 has a beveled edge 171 in the present embodiment. This is not strictly required.

Referring to FIGS. 6A and 6B, it can be seen that flow redirection channels 147, 149, 151 and 153 redirect longitudinally flowing melt from longitudinal inlets 146, 148, 150 and 152 flow into spiral grooves 136, 138, 140 and 142 respectively. In the present embodiment, each flow redirection channel is a gradual bend of about 70 degrees away from longitudinal (i.e. the angle between the longitudinal inlet and the upstream end of the spiral groove is approximately 110 degrees). This angle may vary somewhat in alternative embodiments. The shape of the flow redirection channel may help to minimize the pressure drop through the flow redirection channel. Similar flow redirection channels (not expressly shown) may interconnect the other longitudinal inlets 146, 148 with their respective spiral grooves 136, 138.

As best seen in FIG. 6B, the intermediate flow channel 172 has a peripheral annular portion that gradually increases in thickness, in the downstream direction, from a thickness T1 to a thickness T2. The intermediate flow channel 172 also has a downstream portion 173, which is bowl-shaped in the present embodiment. In the downstream portion 173, the thickness of the annular channel lessens from a thickness T2 to a thickness T3.

Operation for producing a multilayer melt stream using nozzle 100 may be as follows. With the valve stem 125 in the open position shown in FIG. 2, melt from a first common source (e.g. an injection unit for providing pressurized molten PET to a hot runner incorporating nozzle 100) is split into two streams upstream of nozzle 100. The first stream, which will become the inner melt layer, enters the inner layer material channel 112 and flows into the inner melt flow channel 134 towards the tip 108 of the nozzle 100. The second stream, which will become the outer melt layer, enters outer layer material channel 118 and passes through passage 132 (FIG. 1) before being split into four flows (not expressly depicted). The four flows supply melt to the four respective flow transition channels, including channels 174 and 176, comprising outer melt flow channel 178 (FIG. 2). Ultimately, the flow transition channels reshape and merge the flows into a single annular outer melt flow that surrounds the inner melt flow produced by the inner channel.

The inventors have observed that, despite the use of multiple "tulip" flow transition channels to form the annular outer melt flow from multiple semi-annular flows, no witness lines are apparent in the outer layer of molded articles in tested embodiments. This may be due, at least in part, to the properties of the outer layer material (e.g. substantial translucency, as in the case of many PET applications) and/or the "visual dominance" of the intermediate layer, which may be pigmented and may thereby obscure or hide witness lines (if any) in the annular outer layer.

Meanwhile, melted intermediate layer molding material from a second common source (e.g. another injection unit) enters intermediate layer material channels 114, 116 and flows through the four feeder channels 210, 212, 214 and 216 defined by the housing 102, the spiral groove insert 104 and the tulip insert 106, as described above, into the respective inlets 146, 148, 140 and 152. As will be apparent from FIGS. 6A and 6B, in the present embodiment, the melt flows exclusively within the longitudinal inlet grooves, i.e. does not yet spill over from the grooves. The flow redirection channels 147, 149, 151 and 153 (FIG. 6A) redirect the melt into the four spiral grooves 136, 138, 140 and 142 respectively. At the upstream ends of the spiral grooves, the melt beings to spill over from the spiral grooves to form an annular flow. Initially, the melt flows primarily along the helical paths defined by the spiral grooves. However, by virtue of the decreasing height of, and increasing clearance over, the lands 160, 162, 164 and 166 in the downstream direction (see FIG. 2), the melt begins to spill over the lands by progressively larger amounts. The spillover is depicted in FIG. 3 as arrows 220 whose width is substantially proportional to the degree of spillover, which progressively increases in the downstream direction. The increasing spillover forms a progressively thickening axial annular flow within the intermediate melt flow channel 172. Beyond the termini of the spiral grooves, the annular flow becomes fully axial.

The inner melt stream, annular intermediate melt stream, and outer melt stream ultimately merge combination area 199 (FIG. 2) to form a multilayer flow that passes through gate 202 and into mold cavity 204.

Figure 7:
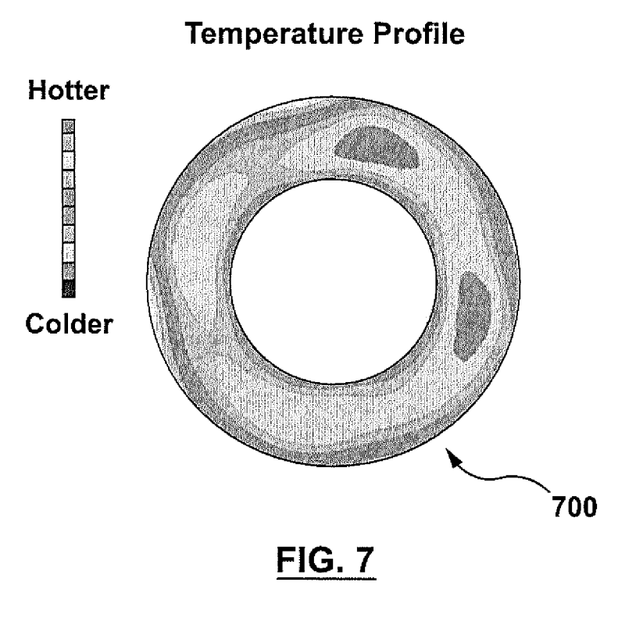
FIG. 7 is a cross sectional temperature profile of an annular melt stream produced by the intermediate melt flow channel of the nozzle of FIG. 1.
Figure 8:
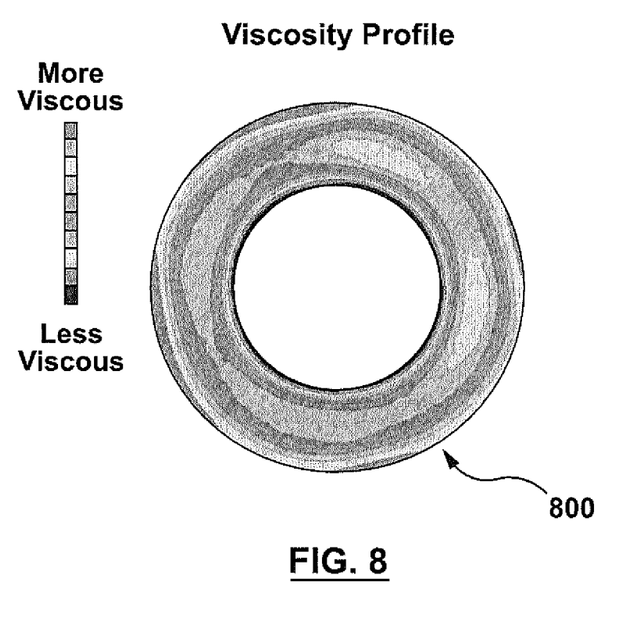
FIG. 8 is a cross sectional viscosity profile of the annular melt stream produced by the intermediate melt flow channel of the nozzle of FIG. 1.

The design of intermediate melt flow channel 172, including the incorporation in a channel wall of multiple spiral grooves fed by respective feeder channels, promotes a uniform temperature and viscosity profile of the annular intermediate melt layer. To illustrate, FIGS. 7 and 8 provide a cross-sectional temperature profile 700 and cross-sectional viscosity profile 800, respectively, of the annular intermediate melt layer taken downstream of the termini of the spiral grooves. The temperature and viscosity profiles were generated using computational fluid dynamics (CFD) modelling of non-Newtonian flow on the assumptions of an adiabatic system, constant flow rates, steady state analysis. As illustrated, temperature profile 700 shows a substantially uniform temperature about the circumference of the annular flow. Similarly, viscosity profile 800 shows a substantially uniform viscosity about the circumference of the annular flow.

Figure 9:
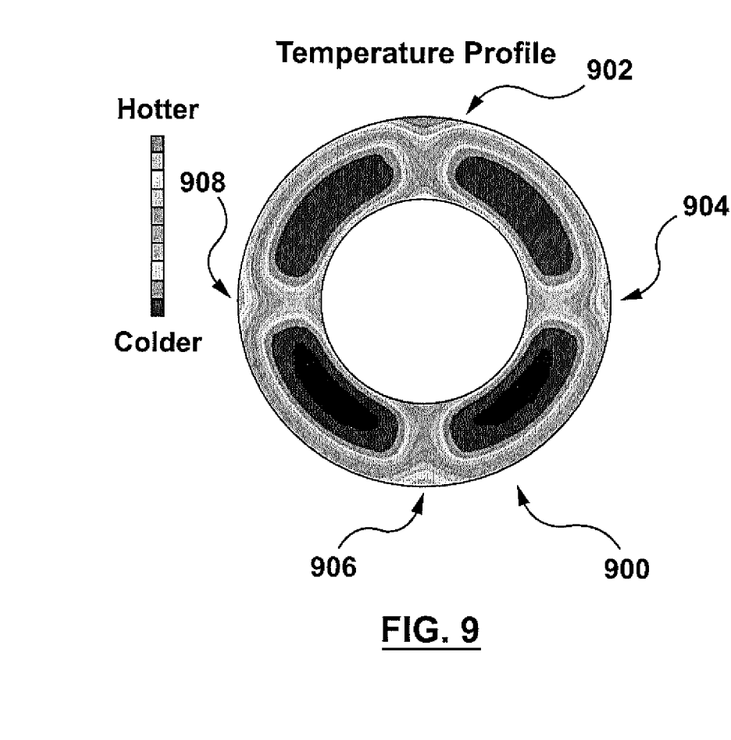
FIG. 9 is a cross sectional temperature profile of a notional annular melt stream produced by an alternative intermediate melt flow channel.
Figure 10:
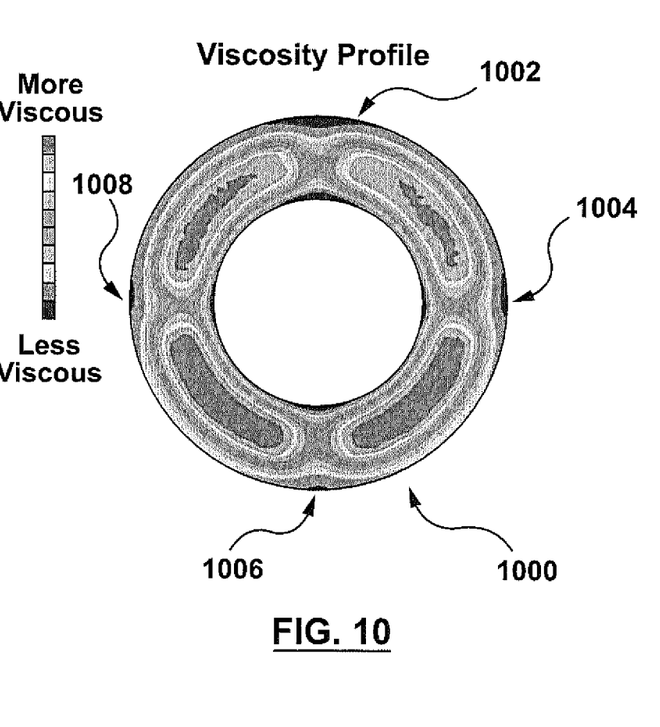
FIG. 10 is a cross sectional viscosity profile of the notional annular melt stream produced by the alternative intermediate melt flow channel.

For the sake of comparison, FIGS. 9 and 10 illustrate a cross-sectional temperature profile 900 and viscosity profile 1000, respectively, of a hypothetical annular intermediate melt layer generated using an alternative co-injection nozzle (not depicted) in which the intermediate melt flow channel comprises a ring of four flow transition channels ("tulips"), similar to those of outer melt flow channel 178 of nozzle 100. Notably, temperature profile 900 shows that the temperature of the annular intermediate melt layer would be hottest (due to shear effects) at the flow transition channel ("tulip") boundaries 902, 904, 906 and 908 and coolest in the middle of the quarter-annular sections produced by the respective channels. Similarly, viscosity profile 1000 shows that the viscosity of the melt would be highest at the flow transition channel boundaries 1002, 1004, 1006 and 1008 and lowest in the middle of the quarter-annular sections. An annular intermediate melt stream having those properties may risk defects in molded articles.

Figure 11:
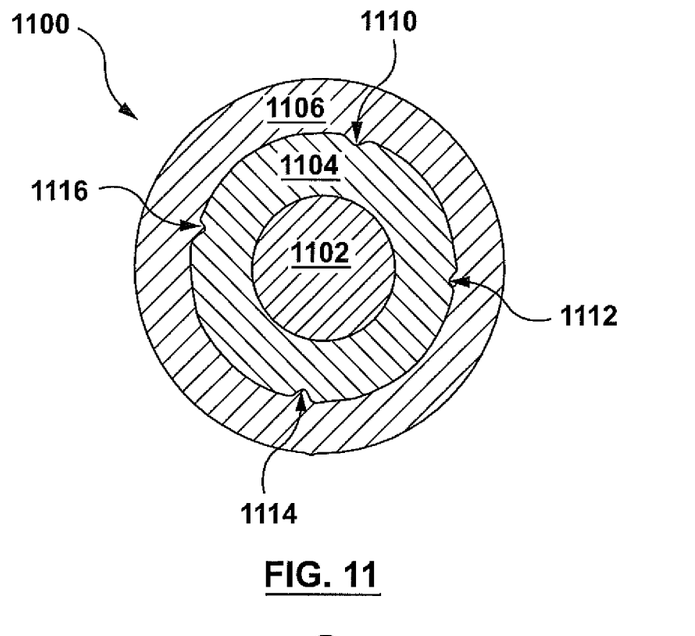
FIG. 11 is a cross section of a multilayer melt stream resulting from a combination of the notional annular melt stream of FIGS. 9 and 10 combined with inner and outer melt streams.

To illustrate this risk, FIG. 11 depicts a cross-section of a hypothetical multilayer flow 1100 made when the hypothetical non-uniform annular intermediate flow of FIGS. 9 and 10 is sandwiched between an inner melt stream 1102 and an annular outer melt stream 1106, both of substantially uniform viscosity. In view of the viscosity profile of the intermediate layer as depicted in FIG. 10, the annular intermediate layer 1104 of FIG. 11 may be softer at boundary locations 1110, 1112, 1114 and 1116 than it is elsewhere. As a result, the outer layer material may disproportionately displace the softer intermediate layer melt in comparison to the melt in adjacent areas of the intermediate layer. Accordingly, the intermediate layer may become indented (thinner) at the boundary locations 1110, 1112, 1114 and 1116. The indented areas may manifest as visible witness lines in a molded article.

Figure 12:
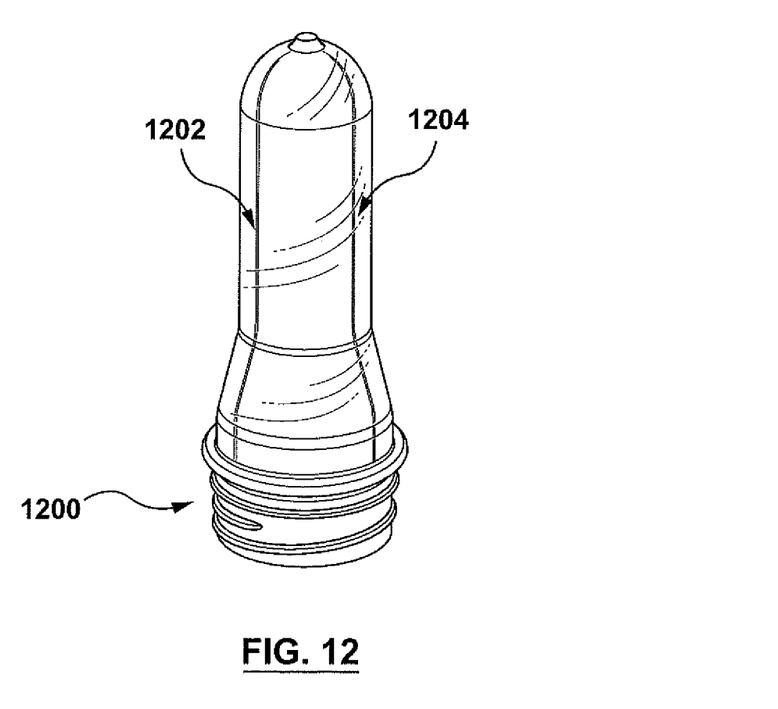
FIG. 12 is a perspective view of a molded preform showing defects that could arise from the multilayer melt stream of FIG. 11.

For example, FIG. 12 is a perspective view of an example preform 1200 injection-molded from a multilayer melt stream 1100 as shown in FIG. 11. Notably, the preform 1200 has witness lines 1202, 1204 at the boundaries between adjacent flow transition channels. The witness lines may be particularly noticeable when the intermediate layer is pigmented, since the intermediate layer may be thinnest, and therefore lightest, at the witness lines.

In contrast, an annular intermediate melt layer formed by the nozzle 110 of FIGS. 1 and 2 has a substantially uniform viscosity, as illustrated in FIG. 8. This may prevent or limit disproportionate displacement of the intermediate layer by the outer melt layer. Witness lines or similar blemishes in molded articles may thus be limited or avoided.

The claimed solution may be particularly advantageous when an efficacy of the intermediate layer material for its intended purpose, whatever the purpose may be (e.g. serving as an oxygen or light barrier), is thickness-dependent. For example, as already mentioned, the intermediate layer may be pigmented. In such embodiments, the color of a molded article will appear lighter in areas where the intermediate layer is thinnest. This may not only be aesthetically displeasing, but may also detrimentally diminish light-blocking effects intended for preserving a quality of liquid contents (e.g. beverage or food quality). Alternatively, if the intermediate layer material is designed to reduce permeability to oxygen, e.g. to reduce a likelihood of spoilage of a contained food or beverage, any thin areas would undesirably introduce areas of locally increased oxygen permeability in the molded article or any subsequently blow-molded container. This may in turn undesirably increase a susceptibility to spoilage of foods or beverages stored in the container.

It is known to employ a spiral groove of diminishing depth in a wall of an annular channel of a multi-layer nozzle to promote homogeneity in a resultant annular flow. However, use of such a spiral groove in an annular intermediate layer, but not in an inner layer or an outer annular layer in the same nozzle, is not believed to be known. The inventors consider this combination to represent a novel compromise providing heretofore unrecognized benefits, at least collectively. The benefits include energy conservation, maximizing mold capacity, and promoting molded article quality.

For example, use of the nozzle 100 may conserve power because inner and outer melt flows can be produced using channels that do not force melt through helical (spiral) sections. It has been observed that a helical channel section may result in a relatively high pressure drop between inlet and outlet compared to other channel geometries, e.g. compared to channels employing tulips to generate an annular flow. To compensate for the pressure drop through a spiral section, it may be necessary or prudent to utilize upstream equipment (e.g. a larger injection unit) that is capable of producing a higher melt pressure than might be used in the absence of the helical channel section. Such equipment may consume more power than equipment that might otherwise be used to produce a melt flow of lower pressure. Thus, avoiding helical sections in the inner and/or outer layer melt streams may reduce the amount of energy that is required to produce a multilayer melt stream for co-injection molding purposes.

The combination described herein may also maximize a mold capacity by allowing nozzle size to be minimized. In particular, if each melt layer were formed using a helical channel section similar to what is shown in the intermediate melt flow channel 172 of FIG. 2, then it may be necessary to increase the size of the nozzle overall. The nozzle size increase may be an unavoidable or likely consequence of increasing a size of the inner and/or outer melt channels. Those channel sizes may be increased to compensate for (or reduce) the pressure drop between the inlet and the outlet of the helical section in each of said channel(s). By avoiding the helical sections in the inner and outer layers, the need for increased inner and/or outer channel size may be avoided. In turn, nozzle size, and therefore mold pitch, may be reduced, and a mold capacity, in terms of the number of articles molded per cycle, may be increased.

The combination described herein may also benefit molded article quality, for two reasons. Firstly, by avoiding a significant pressure drop through the outer layer channel (as might exist if the outer channel were to have a helical section), melt pressure at the nozzle outlet may be maintained at a sufficiently high level to limit or avoid short shots. An example of a short shot that might be avoided is when outer layer material does not fully reach relief features of the mold cavity, such as threaded neck finish areas of a preform, which are often furthest from the gate (the point of ingress of melt into the mold cavity). Secondly, the described combination does not require a highly pressurized outer layer melt to be channeled through helical channel sections. If that were done, the melt may be could excessively worked, which may cause melt to degrade or may produce undesirably high levels of acetaldehyde (in the case of PET) for example.

Further, the above-described use of respective feeder channels to supply melt, from a common source, to multiple spiral grooves of the intermediate melt flow channel may enhance a uniformity, in terms of temperature and/or viscosity, of the annular flow produced by the intermediate melt flow channel 172, in comparison to using, e.g., an annular inlet for supplying melt to the annular intermediate channel. If an annular inlet were used, shear effects may cause the cylindrical innermost layer and cylindrical outermost layer of the inflowing melt to be hotter than the melt between those layers. A disproportionately hot cylindrical melt layer from such an annular inlet may not be well-homogenized (in temperature) with the cooler melt by spiral grooves defined in an opposing wall of the annular channel, because the hotter melt could pass by the spiral grooves largely unperturbed. Moreover, if an annular inlet were used, shear effect variations may cause non-uniform flow through the annular melt pool, which may exaggerate melt flow rate differences into the spiral channels. That could in turn compromise a uniformity, in terms of temperature and/or viscosity, of the annular melt stream that is produced by the channel.

The inventors have also recognized that, for some applications, it may be desired to dispense an annular flow of intermediate material only selectively while the annular flows of inner and outer skin material are being dispensed. Moreover, the intermediate layer flow may be intentionally terminated while the other layers are still flowing. This may be done to prevent intermediate layer material from being exposed on outer surfaces of the molded article, since the intermediate layer material may not be approved for contact with a consumable food or beverage product that may occupy a container blow-molded from the molded article. In cases where the molded article is a container such as a preform, it may be desired for the intermediate layer material to appear only within the walls of the container and not within a neck region or base area of the container. This may be intended to reduce manufacturing costs, e.g. when the intermediate layer material is more expensive than the skin material and incorporation of the intermediate layer material into the neck region or base is unnecessary. When dispensing of the annular intermediate layer is ceased, it may be desired for the cessation to be substantially immediate and uniform across the circumference of the stream. This may promote quality in the molded articles, e.g. by discouraging the formation of so-called "dips" or "fingers" of core material within areas of the article that are intended to be free of the core material. Promoting a uniform flow velocity throughout the annular flow of intermediate layer material, by maximizing a uniformity of melt temperature and viscosity about the circumference of the annular flow using techniques described herein, may beneficially limit or avoid such undesirable formations. The inventors have recognized that, in contrast, avoidance of such dips or finger in the inner and/or outer skin layers may be comparatively unimportant, because the presence of any such fingers or dips in the inner or outer layer may not visually apparent and/or may have a negligible or tolerable detrimental impact, if any, upon the quality of those layers.

Various alternative embodiments are contemplated.

It is not absolutely required for the depth of a spiral groove depth comprising the intermediate melt flow channel to decrease in the downstream direction, as long as the clearance over the lands between the spiral grooves increases in the downstream direction.

To the extent that the annular outer melt layer is produced using multiple flow transition channels similar to what is depicted in FIG. 4, the number of flow transition channels may vary between embodiments. In some embodiments, the number may be chosen based on an outer diameter of the desired annular flow. In particular, the larger the outer diameter of the annular flow, the greater the number of flow transition channels that may be used. The outlets of such flow transition channels therefore need not necessarily be quarter annular as in FIG. 4.

In an alternative embodiment of the hot runner nozzle, spiral grooves could be defined on the inner surface of the tulip insert, i.e. on the outer wall of the intermediate melt flow channel. In such an alternative embodiment, the insert 104 could be formed integrally with housing 102. This may simplify construction. Additive manufacturing techniques such as direct metal laser sintering (DMLS) may be used to manufacture such embodiments.

More generally, although the exemplary nozzle 100 depicted in FIGS. 1 and 2 as a multi-component nozzle, an alternative nozzle embodiment could be manufactured as a single piece, e.g. using additive manufacturing techniques such as DMLS.

The nozzle embodiment depicted in FIGS. 1-5 defines four feeder channels 210, 212, 214 and 216 that supply melt to the four inlets of the four spiral grooves 136, 138, 140 and 142, respectively, i.e. there is a 1:1 relationship between feeder channels and spiral grooves/inlets. In alternative embodiments, there may be a plurality of spiral grooves, each having a respective inlet, and a plurality of feeder channels, but the relationship between spiral grooves and feeder channels may not be 1:1. For example, the relationship could be 1:2, with each feeder channel supplying the inlets of two spiral grooves, e.g. via a semi-annular feeder groove defined about a periphery of the nozzle.

Other modifications may be made within the scope of the following claims.

What is claimed is:

1. A co-injection molding method comprising:
splitting a first melt flow between an inner channel and an outer channel of a co-injection hot runner nozzle, the outer channel forming an annular outer melt flow that surrounds an inner melt flow formed by the inner channel; and
splitting a second melt flow among a plurality of feeder channels upstream of an annular intermediate channel of the co-injection hot runner nozzle, the intermediate channel being disposed between the inner and outer channels and being at least partly defined by a plurality of spiral grooves, each spiral groove having a respective inlet, the plurality of feeder channels supplying melt to the inlets of the plurality of spiral grooves, the intermediate channel being further defined by lands between adjacent spiral grooves that increase in clearance in a downstream direction, wherein melt comprising the second melt flow travels along helical paths defined by the respective spiral grooves and spills over the lands to form an annular axial flow, wherein the forming of the annular outer melt flow comprises passing melt through a plurality of flow transition channels arranged in a ring, each of the flow transition channels having an inlet, an outlet with a part-annulus shape, and a pair of opposing side walls that diverges in the downstream direction.

2. The co-injection molding method of claim 1 wherein the number of feeder channels matches the number of spiral grooves and wherein each feeder channel supplies melt to the inlet of a respective one of the spiral grooves.

3. The co-injection molding method of claim 2 wherein each inlet is a longitudinal channel and further comprising gradually redirecting longitudinally flowing melt from each inlet by about 70 degrees into its respective spiral groove.

\* \* \* \* \*